United States Patent [19]

Sachser

[11] 3,988,800

[45] Nov. 2, 1976

[54] CASTER FOR FURNITURE AND THE LIKE

[75] Inventor: Herbert Sachser, Wermelskirchen, Germany

[73] Assignee: Albert Schulte Sohne KG, Wermelskirchen, Germany

[22] Filed: Apr. 17, 1975

[21] Appl. No.: 569,179

[30] Foreign Application Priority Data

May 8, 1974 Germany............................ 2422154

[52] U.S. Cl.................................... 16/35 R; 16/43; 188/1 D
[51] Int. Cl.².......................................... B60B 33/00
[58] Field of Search..................... 16/35 R; 188/1 D

[56] References Cited
UNITED STATES PATENTS

| | | | |
|---|---|---|---|
| 3,705,438 | 12/1972 | Stosberg et al. | 16/35 R |
| 3,881,216 | 5/1975 | Fontana | 16/35 R |

FOREIGN PATENTS OR APPLICATIONS

| | | | |
|---|---|---|---|
| 1,564,850 | 3/1969 | France | 16/35 R |
| 1,134,805 | 8/1962 | Germany | 16/35 R |
| 272,537 | 12/1950 | Switzerland | 16/35 R |
| 743,438 | 1/1956 | United Kingdom | 16/35 R |

*Primary Examiner*—Werner H. Schroeder
*Assistant Examiner*—Conrad L. Berman
*Attorney, Agent, or Firm*—Michael J. Striker

[57] ABSTRACT

A caster for furniture and the like has a ground-engaging rolling member, an upright mounting fork which rotatably mounts the rolling member and a support element which projects upwardly from the mounting fork and is formed with an upright passage. A mounting arrangement mounts the fork on the support element so that the fork can turn about an upright axis, and a pin is longitudinally shiftable in the passage of the support element between a plurality of positions. An arresting arrangement serves to arrest the fork against turning about the upright axis, and includes a first set of teeth provided on the support element and a second set of teeth provided on the pin. These teeth extend parallel to the upright axis and are engageable with one another in dependence upon the position of the pin in the passage to prevent turning of the fork about the upright axis when they are in such engagement.

15 Claims, 2 Drawing Figures

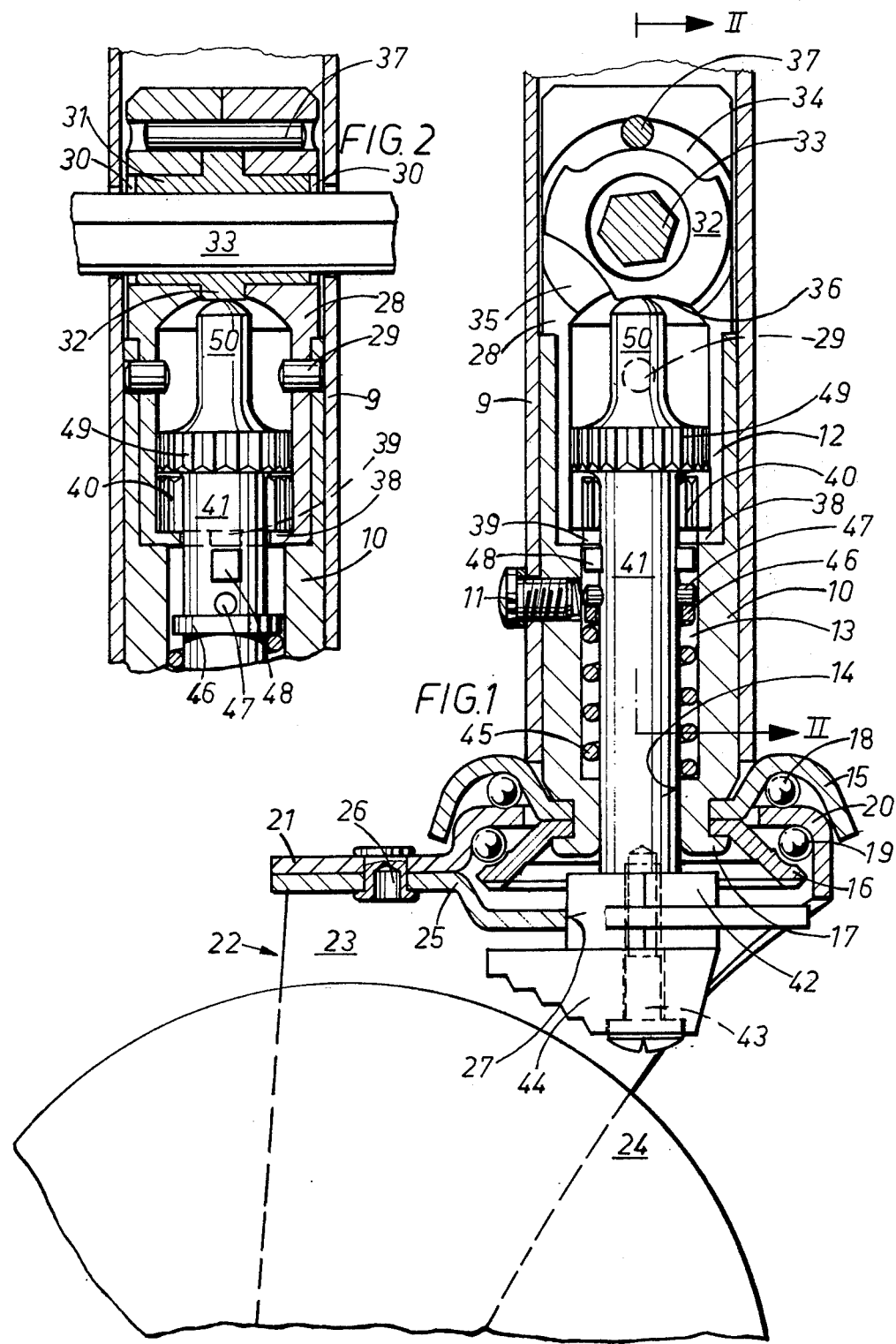

CASTER FOR FURNITURE AND THE LIKE

BACKGROUND OF THE INVENTION

This invention relates to a caster for furniture, apparatus or the like, especially — but not exclusively — for hospital beds.

The term caster includes any type of support structure for beds, furniture and the like which enables these items to be rollingly displaced on a support surface. Thus, a caster includes a device having a wheel, a roller, or the like.

Casters of this type are already known, but for various reasons they are not entirely satisfactory. One of these reasons is the fact that in the prior art such casters usually have a device which can be moved to a position in which it prevents turning of the caster about its upright axis, and a further device which engages the rolling member of the caster to brake the rotation of the rolling member. The prior art proposes constructions wherein the turning of the caster about its upright axis and the rotation of the rolling member are prevented simultaneously, thus making it impossible to either lock the caster against rotation of its rolling member but continue it to permit to turn about an upright axis, or to lock the caster against turning about its upright axis but continue to permit the rolling member to roll. This is disadvantageous and further improvements in this state of the art are desirable for obvious reasons.

SUMMARY OF THE INVENTION

It is, accordingly, a general object of this invention to provide such further improvements.

More particularly, it is an object of this invention to provide a novel caster for furniture and the like which avoids the disadvantages of the prior art.

In keeping with these objects, and with others which will become apparent hereafter, one feature of the invention resides in a caster for furniture and the like which, briefly stated, comprises a ground-engaging rolling member, an upright mounting fork rotatably mounting the rolling member and a support element projecting upwardly from the mounting fork and formed with an upright passage. Mounting means mounts the fork on the support element turning about an upright axis and a pin is longitudinally shiftable in the passage between a plurality of positions. Arresting means serves to arrest the fork against turning about the upright axis and comprises a first set of elongated upright teeth on the support element and a second set of elongated upright teeth on the pin, these teeth all having over their entire respective length a uniform distance from the upright axis and being engageable with one another in dependence upon the position of the pin in the passage.

The caster can be further provided with a braking member which is adapted to engage the rolling member to brake the rotation thereof, and the cooperation of the components is such that the turning of the caster about the upright axis can be prevented without at the same time braking the movement of the rolling member, or vice versa, and that under all circumstances the effectiveness of the blocking action exerted upon the caster to prevent its turning about the upright axis does not depend upon the degree of braking force with which the braking element engages the rolling member, another disadvantage of the prior art. Engagement of the teeth is always positive and, once effected, will remain until it is again positively terminated. The caster according to the present invention thus avoids the disadvantages of the prior art, is easier to handle than those of the prior art and because of its construction also tends to eliminate the possibility of undesired noise, for example noise which may occur when, in the prior art, inadequately meshing teeth slip with reference to one another.

It is preferred that the teeth extend in axial parallelism with the upright axis, but it is possible to have the teeth extend helically about the upright axis, as long as they are spaced over the entire length from the axis by a uniform distance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a vertical section showing a caster installed in the lower end of a leg of a piece of furniture or the like; and FIG. 2 is a fragmentary section taken on line II—II of FIG. 1.

DESCRIPTION OF THE PREFERRED EMBODIMENTS

Before discussing FIGS. 1 and 2 in detail it is pointed out that in both Figures the caster is shown in a position in which its rolling member, here shown as a wheel, is free to rotate and in which further the caster is free to turn about an upright axis.

Referring now in detail to FIGS. 1 and 2 it will be seen that reference numeral 9 identifies the lower end portion of the tubular leg of a piece of furniture, for example, of a hospital bed or the like. A pin 10 constituting a part of a support element is pushed into the lower open end of the leg 9 and is retained in position by a screw 11 which is threaded into aligned openings in the wall of the leg 9 and the pin 10. The pin 10 is formed with an upright central passage which is of stepped configuration, having a widest passage portion 12, below it a less wide passage portion 13 and below the same a passage portion 14 which has still a smaller diameter. The lower end portion of the pin 10 in which the portion 14 of the passage is formed, is provided with an outer circumferential shoulder which is abutted by two bearing flanges 15 and 16 which are held in place by upsetting the lower end of the pin at 17 and between which there extends a portion 20 of a bight 21 of an upright mounting fork 22. The portion 20 forms with the bearing flanges 15 and 16 a pair of races in which annuli 18 and 19 of bearing balls are accommodated, thus mounting the mounting fork 22 on the pin 10 for a turning movement about an upright axis. The mounting fork 22 has two upright arms which straddle a rolling member 24 at the opposite sides of the latter (only one of the legs 23 is shown) and which are of course in the usual manner connected with the rolling member 24 so that the latter is mounted in the fork 22 and can turn about a horizontal axis (not shown). As mentioned before, the rolling member 24 which is illustrated as a wheel could be replaced with a roller or the like. Mounted underneath the bight 21 of the fork 22 is an arm 25 which is held in place by a rivet 26 and which is provided with a polygonal (and preferably hexagonal) hole 27 that is axially aligned with the pin 10. Arm 25 moves with fork 22.

Installed in the largest-diameter portion 12 of the upright passage is a sleeve 28 which in the illustrated embodiment is longitudinally split and thus composed of two sleeve sections (compare FIG. 2) which are held in position against axial and circumferential displacement by at least one (or two, as shown) pin 29 which extends through aligned holes formed in the sleeve 28 and the wall of the pin 10, respectively. It is advantageous if the outer diameter of the sleeve 28 is smaller than the outer diameter of the pin 10, as in the illustrated embodiment. The upper end portion of the sleeve 28 is provided with two transversely aligned bores 30 in which journalling portions 31 of a cam 32 are rotatably received. The cam 32 which is of generally cylindrical contour, is formed with a passage of polygonal cross-section that extends axially through it (compare FIGS. 1 and 2) and in which a shaft 33 of mating cross-section is received, which also extends through holes in the wall of the leg 9. Thus, turning of the shaft 33 effects rotation of the cam 32. The circumference of the cam 32 is formed with three circumferential cam tracks in form of recesses 34, 35 and 36. A pin 37 extending transversely of the sleeve 28, preferably to cooperating openings of the two sections of the sleeve 28 to hold the sections together, extends into the recess 34 and constitutes with the opposite circumferential ends of the recess 34 an abutment arrangement which limits the extent to which the cam 32 can be rotated by turning the shaft 33. The depth of the recess 35 (in direction radially of the cam 32) is greatest, the depth of the recess 34 is smaller and the depth of the recess 36 is between that of the recesses 34 and 35. The lower end of the sleeve 28, which extends into the passage portion 12, is provided with an inner shoulder 38 which has one, or preferably two diametrically opposite depressions 39. This latter embodiment is shown in FIGS. 1 and 2. Each of the sections of the sleeve 28 is provided adjacent the shoulder 38 with a group of teeth 40 which extend in this embodiment in parallelism with the upright axis of the passage and hence of the pin 10. The distance of the teeth from this axis must be uniform throughout the entire length of the teeth, which in this embodiment is assured by their parallelism with the axis.

A further pin 41 extends through the passage portion 14 in which it can slide axially of the passage as well as turn. A lower end portion 42 of the pin 41 is of polygonal cross-section and extends into the hole 27 of the arm 25, so that it cannot turn relative to the arm 25 but can shift axially in the hole 27. A screw 43 connects a brake shoe 44 with the lower end portion 42; the purpose of the brake shoe 44 is to brakingly engage the rolling member 24.

A precompressed helical spring 45 surrounds the pin 41 in the passage portion 13, bearing upon the shoulder formed at the step between the passage portions 13 and 14 and bearing with its other end upon a support ring 46 which surrounds the pin 41 and which abuts a transverse pin 47 that extends through the pin 41. Upwardly of the pin 47 the pin 41 is provided with at least one (or two, as illustrated) transverse projections 48 having a configuration that is mating to that of the recesses 39 in the shoulder 38, as shown in FIG. 2.

The pin 41 is further provided, within the sleeve 28 and upwardly of the teeth 40, with a circumferentially complete annulus of teeth 49 that also extend in parallellism to the upright axis of rotation. Depending upon the axial position of the pin 41, i.e. depending upon whether it is vertically displaced in the passage of the pin 10, the teeth 49 mesh with the teeth 40 of the sleeve 28 and when they are in such engagement these cooperating sets of teeth will prevent rotation of the pin 41 with reference to the pin 10. Evidently, this also prevents rotation of the fork 22 about the upright axis defined by the pin 41. Upwardly of the annulus of teeth 49 the pin 41 is provided with an end portion or head 50 which engages the cam 32 under the biasing action of the spring 45.

As mentioned before, FIGS. 1 and 2 show the pin 41 in its center position. In this position the head 50 engages the medium-depth recess 36, so that the brake shoe 44 is out of engagement with the rolling member 24 so that the latter is freely turnable. Furthermore, the pin 41 is freely turnable in the pin 10 since the projections 48 are not received in the recesses 39 of the sleeve 28 and the teeth 40, 49 are not in engagement with one another. Since the end portion 42 is matingly received in the hole 27 of the arm 25, the mounting fork 27 can freely turn about an upright axis, namely that defined by the pin 41.

Assuming now that the shaft 33 is turned in clockwise direction, thereby displacing the cam 32 in the same direction in FIG. 1, the displacement of the cam 32 with the head 50 of the pin 41 causes the latter to be shifted downwardly in FIG. 1 and effects meshing engagement of the teeth 49 with the teeth 40. In addition thereto, but independently thereof, the brake shoe 44 is pressed against the rolling member 24. Thus, the caster is blocked both against turning about the upright axis of the pin 41 and against rolling of its rolling member 24. The proper meshing engagement of the teeth 40 and 49 is entirely independent of the contact pressure with which the brake shoe 44 engages the rolling member 24.

If, on the other hand, the shaft 33 in FIG. 1 is turned in counterclockwise direction and similarly turns the cam 32 until the pin 37 abuts the right-hand end of the recess 34 instead of the left-hand end as before, the recess 35 of the cam 32 becomes active and is now engaged by the head 50. Since the recess 35 is deeper than the recess 36, the pin 41 can move upwardly out of the position shown in FIGS. 1 and 2 and the projections 48 of the pin 41 engage the underside of the shoulder 38. In this position the projections 48 either enter directly into the recesses 39 of the shoulder 38, if as an exceptional matter they should happen to be aligned with these recesses, or else they will enter into these recesses when the projections 48 slide on the underside of the shoulder 38 in response to a slight turning of the pin 41 about its upright axis. In any case, once the projections 48 have so entered into the recesses 39, they preclude further turning of the pin 48 about its upright axis. During this movement of the pin 41 in upward direction the brake shoe 44 of course moves upwardly away from the rolling member 24 to a still more pronounced extent than is shown in FIG. 1 so that the furniture or the like provided with such a caster can now be freely rolled since the rolling member 24 is not blocked against rotation, whereas turning of the caster about the upright axis of the pin 41 is precluded.

The embodiment illustrated, wherein the annulus of teeth 49 is complete but the teeth 40 are provided on the sleeve 28 only in form of circumferentially spaced groups of teeth, permits an inexpensive manufacture of the components in question. This is also the reason for splitting the sleeve 28 axially in half so that it is composed of two sections which can be more readily handled and installed.

It will be appreciated that modifications are possible in the exemplary embodiment and are intended to be encompassed within the scope and intent of this disclosure. Thus, the cam 32 could be differently configurated, and it is possible to effect its turning in a manner other than by means of the shaft 33. The latter, incidentally, should be understood to be provided exteriorly of the leg 9 with a suitable engaging portion at one or both of its ends, for example a knurled knob or the like. The dimensions of the hole 27 may be greater than the cross-section of the end portion 42 of the pin 41, so that the engagment of this end portion 42 in the hole 27 will still effect its intended purpose but variations in the components involved or similar factors will not interfere with the proper cooperation between the hole 27 and the end portion 42. Also, instead of the brake shoe 44 the pin 41 might engage an arm or lever which is mounted on the mounting fork 22 and which in turn would be displaced — by engagement with the pin 41 as the latter moves — into a position in which it brakes the turning of the rolling member 24, or permits such turning. The teeth 40 and 49 might even be arranged in the region of such an arm.

It will be understood that each of the elements described above, or two or more together, may also find a useful application in other types of constructions differing from the types described above.

While the invention has been illustrated and described as embodied in a caster for furniture and the like, it is not intended to be limited to the details shown, since various modifications and structural changes may be made without departing in any way from the spirit of the present invention.

Without further anlysis, the foregoing will so fully reveal the gist of the present invention that others can by applying current knowledge readily adapt it for various applications without omitting features, that from the standpoint of prior art, fairly constitute essential characteristics of the generic or specific aspects of this invention.

What is claimed as new and desired to be protected by Letters Patent is set forth in the appended claims:

1. A caster for furniture and the like, comprising a ground-engaging rolling member; an upright mounting fork rotatably mounting said rolling member; support means supporting said fork for turning about an upright axis, including a support element projecting upwardly from said mounting fork and formed with an upright passage, and a pin received in said passage for relative longitudinal shifting; and arresting means for arresting said fork against turning about said upright axis, including a first set of elongated teeth on said support element, a second set of elongated teeth on said pin, each of said teeth being equidistantly spaced from said upright axis over the entire length thereof, and shifting means for relatively longitudinally shifting said pin in said passage to thereby bring said sets of teeth into and out of engagement with one another.

2. A caster as defined in claim 1; and further comprising braking means on said pin and movable into and out of engagement with said rolling member to brake the same, in dependence upon the position of said pin in said passage.

3. A caster as defined in claim 1, wherein said teeth extend parallel to said axis.

4. A caster as defined in claim 1, wherein said first set of teeth is composed of groups of teeth spaced about said axis, and said second set of teeth forms a circumferentially complete annulus which surrounds said axis.

5. A caster as defined in claim 1, wherein said support element comprises a sleeve mounted in said passage and provided with said first set of teeth and, detent means engaging said sleeve and preventing the same from turning in said passage said shifting means including, biasing means permanently biasing said pin axially of said passage for engagement of said first and second sets of teeth, and a rotary cam journalled in said sleeve and having a plurality of cam tracks adapted to selectively move into engagement with a portion of said pin so as to displace the latter axially of said passage to the respective positions.

6. A caster as defined in claim 5, wherein said sleeve is axially split and composed of two sections, said sleeve having one end portion which is located in said passage.

7. A caster as defined in claim 5, wherein said detent means comprises at least one pin received in aligned transverse holes of said sleeve and said support element.

8. A caster as defined in claim 5, said sleeve having an end portion facing towards said mounting fork and provided with an inner shoulder which is formed with at least one depression, and wherein said pin has a transversely extending projection which is receivable in said depression.

9. A caster as defined in claim 5, wherein said sleeve has an end portion facing towards said mounting fork and provided with an inner shoulder having two diametrally opposite depressions, said pin having at least one transversely extending projection which is receivable in the respective depressions.

10. A caster as defined in claim 5; further comprising cooperating abutment portions on said cam and said support element for limiting the rotation of the former relative to said sleeve.

11. A caster as defined in claim 10, wherein said cam is substantially cylindrical and formed with a recess which extends over part of its circumference, said abutment portions comprising circumferentially spaced end walls of said recess and a projection on said support element which extends into said recess and against which said end walls are adapted to abut.

12. A caster as defined in claim 11, wherein said projection on said support element is a pin extending transversely of said sleeve.

13. A caster as defined in claim 12, wherein said sleeve is longitudinally split and composed of two sections, and wherein said pin on said support element connects said two sections.

14. A caster as defined in claim 1, wherein said mounting fork has two upright arms and an upper bight portion connecting said arms and through which a lower end portion of said pin extends; further comprising an arm mounted on said bight portion and having a polygonal hole, said lower end portion having a mating polygonal cross-section and extending through said hole.

15. A caster for furniture and the like, comprising a rolling member; means for mounting said rolling member for rotation in contact with the ground, including a mounting member; means for supporting said mounting member for turning about an upright axis, including two elements one of which is stationary and the other shiftable in the direction of said upright axis, one of said elements being connected to said mounting member for shared turning therewith; and arresting means for arresting said mounting member against turning, including a first arresting portion on one of said elements having a set of external circumferentially spaced teeth, a second arresting portion on the other element having a set of internal circumferentially spaced teeth, and means for shifting the shiftable element relative to the stationary element in said axial direction into and out of an arresting position in which said second arresting portion at least partially circumferentially surrounds said first arresting portion and said internal and external teeth engage each other.

* * * * *